United States Patent [19]
Hehl

[11] 3,820,930
[45] June 28, 1974

[54] DEVICE FOR THE PRODUCTION OF PLASTIC BOTTLES BY INJECTION BLOW MOLDING

[76] Inventor: Karl Hehl, Siedlung, 7231 Lossburg/Wuerttemberg, Germany

[22] Filed: June 2, 1972

[21] Appl. No.: 259,279

[52] U.S. Cl............. 425/242 B, 425/205, 425/208, 425/209
[51] Int. Cl............................................ B29f 23/03
[58] Field of Search.......... 425/DIG. 203, DIG. 205, 425/DIG. 208, DIG. 209, DIG. 211, 326 B, 242 B, 243, 246

[56] References Cited
UNITED STATES PATENTS

| | | | |
|---|---|---|---|
| 3,196,198 | 7/1965 | Rex | 425/243 X |
| 3,357,045 | 12/1967 | Ninneman | 425/DIG. 209 |
| 3,394,209 | 7/1968 | Cheney | 425/243 X |
| 3,435,483 | 4/1969 | Heiner et al. | 425/130 |
| 3,480,993 | 12/1969 | Schjeldahl | 425/DIG. 209 |
| 3,584,337 | 6/1971 | Aoki | 425/DIG. 209 |
| 3,609,803 | 10/1971 | Fattori | 425/DIG. 209 |
| 3,702,750 | 11/1972 | Veneria | 425/246 X |

FOREIGN PATENTS OR APPLICATIONS 563,595  1/1958  Belgium................... 425/326 B Primary Examiner—J. Spencer Overholser
Assistant Examiner—David S. Safran
Attorney, Agent, or Firm—Joseph A. Geiger

[57] ABSTRACT

A device for the production of bottles of thermoplastic material in an injection and blow-forming process where in a compound die a row of bottles is premolded around cores in the injection molding portion of the die, while simultaneously a row of premolded bottles is blow-formed to final shape in the blow molding portion of the die, the cores also serving for the transfer of the premolded bottles. The molds and core rows are so arranged and diametrically aligned that a core carrier mounted on a shaft extending through the die at right angles to the die separation plane accomplishes the core transfer by a 180° rotation.

12 Claims, 9 Drawing Figures

DEVICE FOR THE PRODUCTION OF PLASTIC BOTTLES BY INJECTION BLOW MOLDING

BACKGROUND OF THE INVENTION

1. Field of the Invention

The invention relates to injection molding machines, and in particular to devices for the production of articles such as bottles from thermoplastic material in an injection and blowing process, where a premolded bottle is produced in an injection mold, while at the same time another premolded bottle obtained in the preceding operational cycle is blow-formed into the final shape so that, at the end of each cycle, a premolded bottle is transferred from the injection mold to the blow mold, whereby the core around which the premolded bottle is formed moves with the latter into the blow mold.

2. Description of the Prior Art

Among the known prior art devices of the above-mentioned kind is a device which includes two identical, symmetrically arranged injection and blowing units which are mounted on opposite sides of the center axis of a die closing unit. Coinciding with this center axis is the injection axis of the injection unit which supplies thermoplastic raw material to both injection and blowing units simultaneously. Each of the units includes in addition to an injection station and a blow-forming station, a separate cooling station into which the finished bottle is transferred after it leaves the blow mold. Such an arrangement makes it a necessary condition that the device which drives the shaft for the rotation of the core carriers of the two injection and blowing units is arranged between the mounting faces of the die closing unit and also between the two injection and blowing units (German Auslegeschrift No. 1,084,908). The complexity of such an arrangement is not only reflected in the cost of the machine, but also in its limited adaptability to different operational requirements.

SUMMARY OF THE INVENTION

It is a primary objective of the present invention to propose a machine of the above-mentioned kind which is superior to prior art devices in that it offers the same or a higher production capacity and production quality with a considerably simplified construction, while being better adaptable to changing operating requirements.

In order to attain the above-mentioned objective, the invention suggests a machine which includes only one core carrier which is connected to a core rotation shaft whose axis passes approximately through the middle of the center line of the die closing unit, the cores being arranged in diametrally opposite rows.

Such a structural arrangement has the advantage that the rotational drive for the core rotation shaft no longer needs to be arranged in the space between the mounting faces of the die closing unit, a fact which greatly simplifies the mass production of plastic bottles on such a machine. It is further possible in this case to use as drive means commercially available components, which components are also usable for other drive purposes such as, for example, the unscrewing of threaded cores from molded parts (compare my U.S. Pat. application Ser. No. 96,215, filed Dec. 8, 1970).

A further advantage resides in the compact structure of the entire device, the injection unit being conveniently aligned with the separation plane of the mold. The mold cores are preferably arranged in straight rows on the core carrier.

A preferred embodiment of the invention suggests that the cores which extend into the injection mold during a particular production cycle are axially aligned with the opposite cores which extend into the blow mold, all core axes being aligned in a plane which coincides with the common separation plane of the injection molds and blow molds.

It is further suggested that the cavities of all injection molds and all blow molds are arranged on common mounting plates. The injection bushings of the injection molds are aligned with their common separation plane.

A further refinement of the invention suggests that an abutment collar is provided in the area of the movable die plate on the core rotation shaft at a distance from a cooperating abutment ring which is fixedly mounted on the movable die plate, the distance corresponding to one-half of the opening displacement of the die plate. A second abutment collar is similarly arranged on the core rotation shaft in the area of the stationary die plate, facing likewise a stationary abutment shoulder on the stationary die plate, the distance between the latter abutment elements being again one-half of the opening displacement of the die.

BRIEF DESCRIPTION OF THE DRAWINGS

Further special features and advantages of the invention will become apparent from the description following below, when taken together with the accompanying drawing which illustrates, by way of example, a preferred embodiment of the invention, represented in the various figures as follows.

DESCRIPTION OF THE PREFERRED EMBODIMENT

Figure 1:
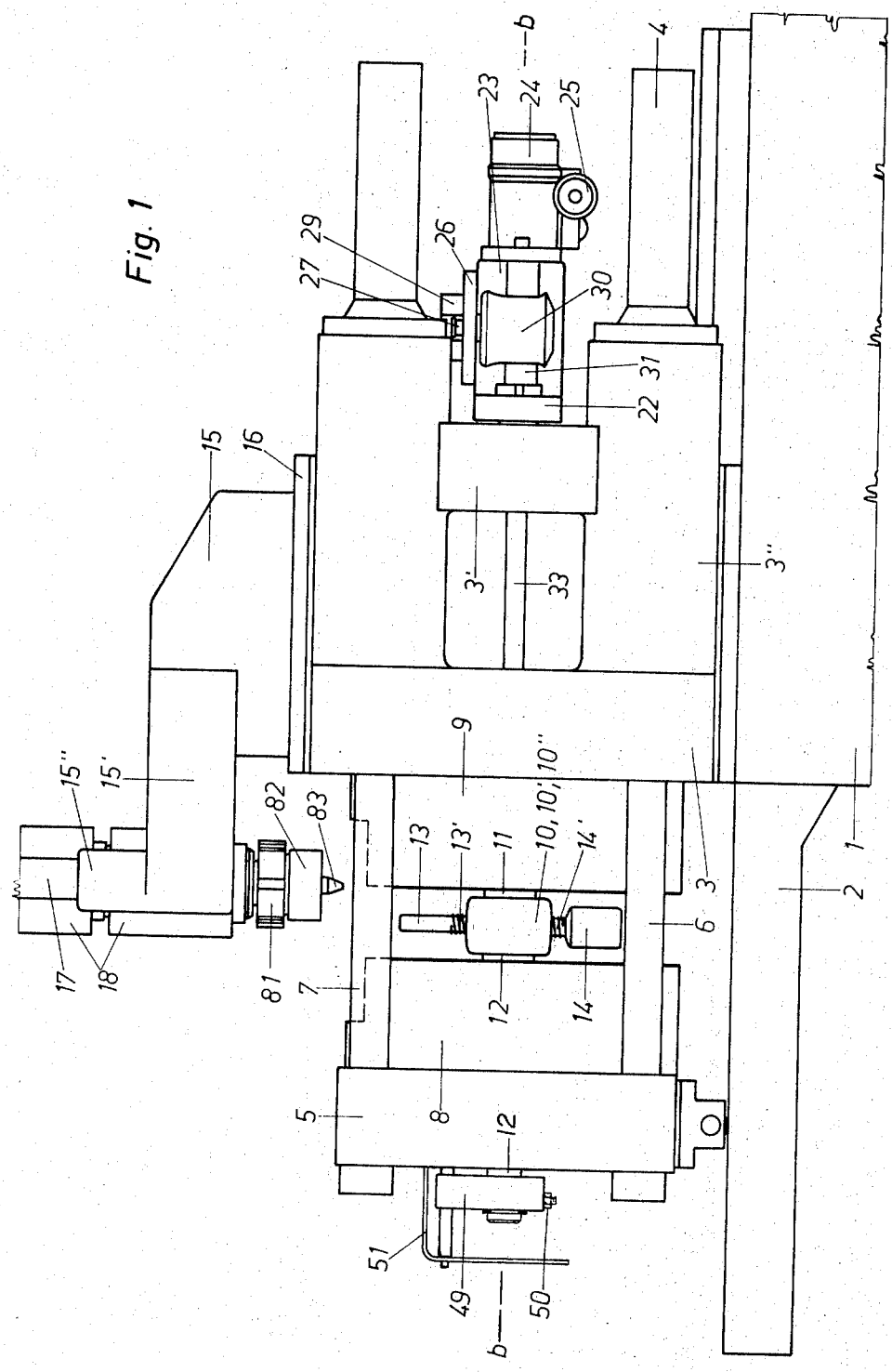
FIG. 1 shows in an elevational side view a device embodying the invention as mounted on an injection molding machine, the injection and blow molds being shown open.

Reference is made in the following to various operating units or subassemblies by way of clusters or groups of reference numerals, for example, "mold 9, 9', 94," or "core 71–75." These expressions mean that the mold is comprised of the parts 9, 9' and 94, and the core includes the parts numbered 71 through 75.

Figure 6:
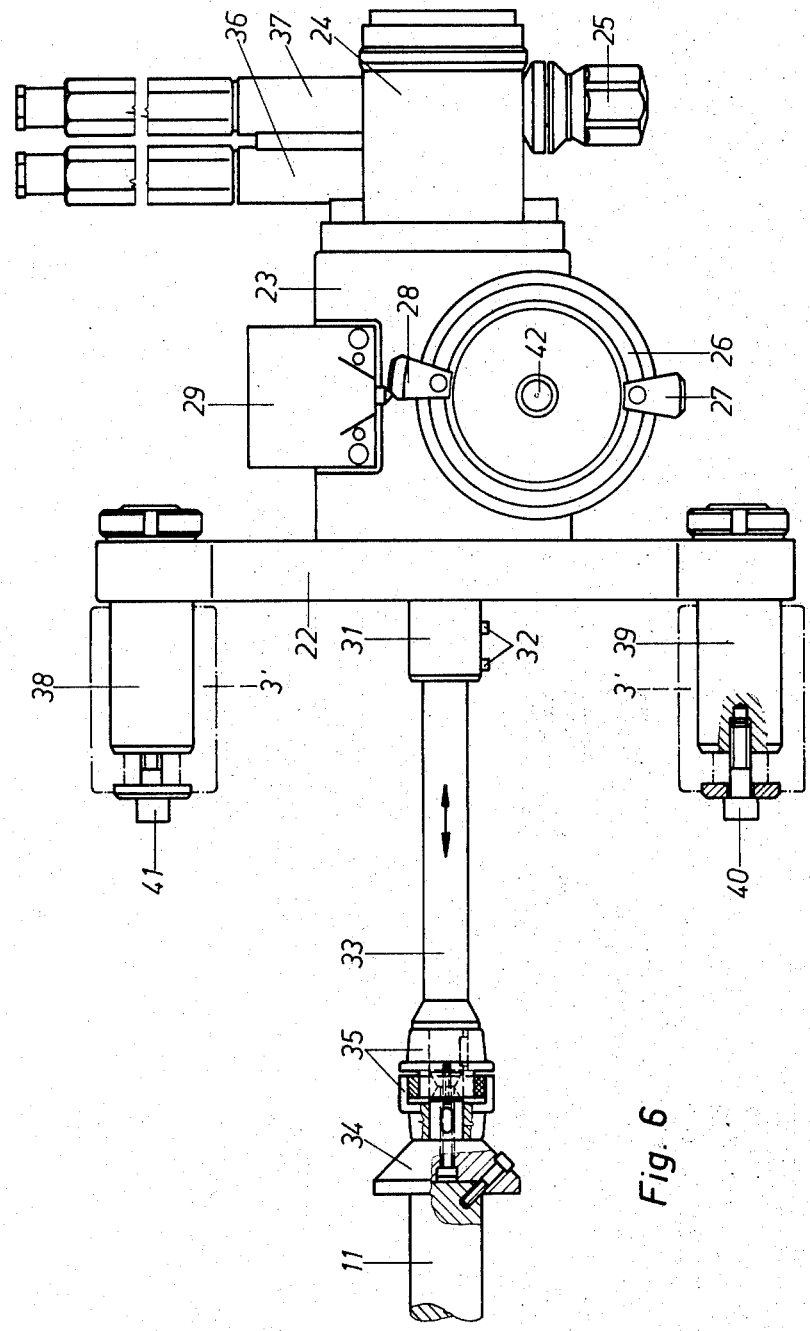
FIG. 6 shows the drive unit for the rotation of the core rotation shaft.

FIG. 1 shows the device of the invention mounted on an injection molding machine. It includes a horizontally arranged die closing unit 3–5 which is mounted on the upper face of the machine frame 1. The stationary die plate 3 of the die closing unit, together with the hydraulic cylinders 3″, the vertical struts 3′, and the coaxially arranged auxiliary cylinders 4, form a single building block of the device. The hydraulic cylinders 3″ provide the closing pressure for the die closing unit, while the auxiliary cylinders 4 serve to open and close the injection and blow molds. The movable die plate 5 is attached to the free ends of the piston rods 6 and 7 of the hydraulic cylinders 3″. Its weight is supported on a cantilever support 2 which is mounted on the machine frame 1. Those elements of the injection and blow mold which are attached to the movable die plate 5 parts 8, 8′, 94 in FIG. 2 form a building block with the latter, while the corresponding opposite elements of the mold (parts 9, 9′ and 94) which are attached to the stationary die plate 3 form a similar building block. The core rotation shaft 11, 12, which is connected to the core carrier 10, 10′, 10″ is arranged to coincide with the center axis b—b of the die closing unit. On the core carrier are mounted two straight rows of cores 71–75 which are arranged in diametrically opposite alignment (FIG. 3). In FIG. 1, the injection and blowing unit is shown open, exposing above its center axis, a core which carries a premolded bottle 13 and below it a core carrying a finished bottle 14. Above the die closing unit is arranged a horizontal guide 16 for a carriage 15 on which is mounted the injection unit (partially cut away), the carriage 15 including horizontal arms 15′ and connecting sections 15″ for the legs 17 of the injection unit of which only the heating elements 18 are shown. The guide 16 gives the injection unit mobility in the direction of die opening. On its lower end the injection unit carries a manifold injection nozzle 81–83 which is shown in detail in FIGS. 7–9 and which will be described further below. The drive unit 22–23 for the rotation of the core carrier shaft and core carrier 10, 10′, 10″ is mounted on the vertical struts 3′ which link the main cylinders 3″ together (FIG. 6). The hollow drive shaft 31 and the connecting shaft 33 are arranged in the center axis b—b of the die closing unit. A detailed description of the latter follows further below.

Figure 2:
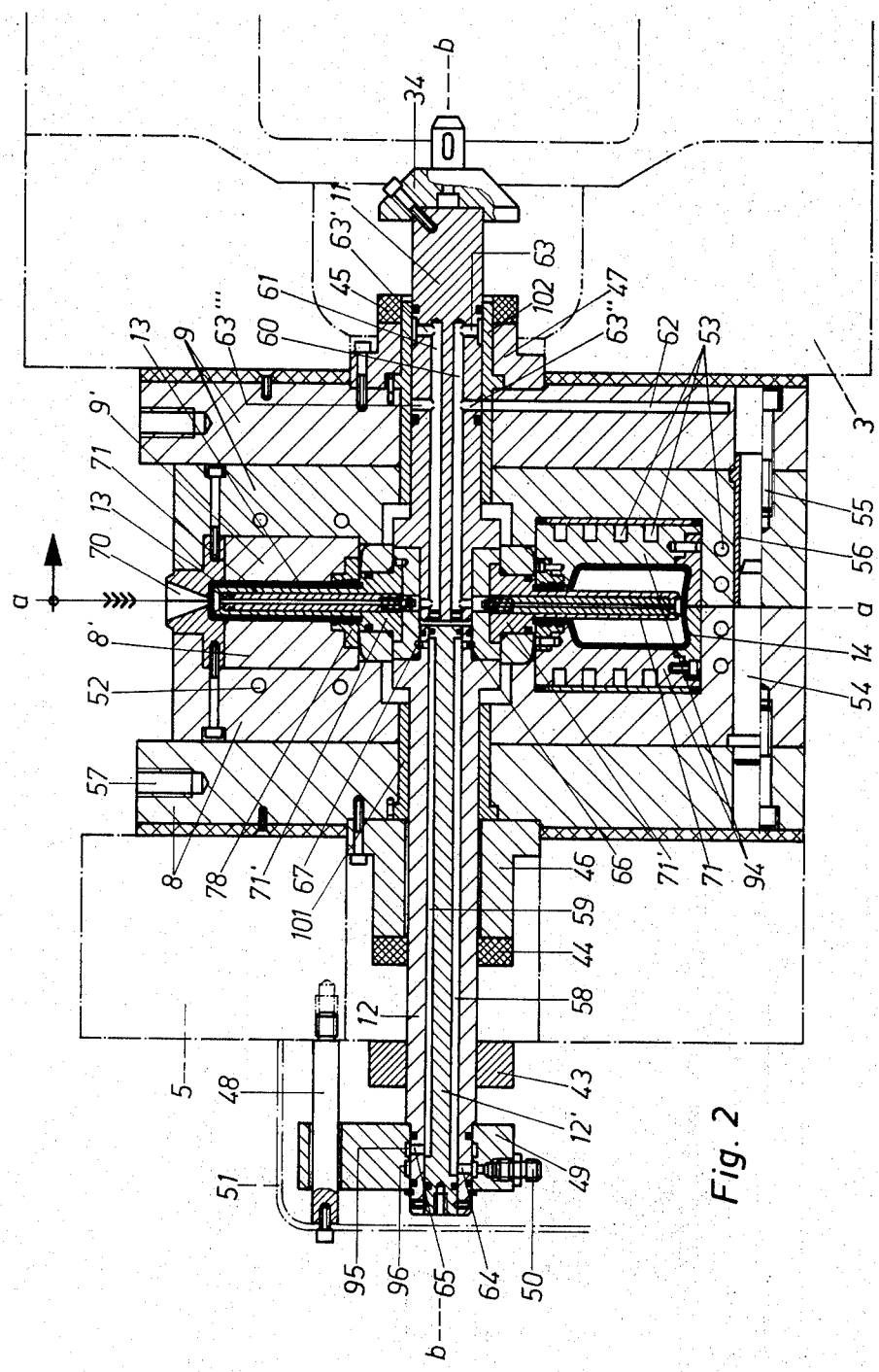
FIG. 2 shows an enlarged longitudinal cross section of the device of FIG. 1, the core rotation drive being omitted and the molds being shown closed.
Figure 3:
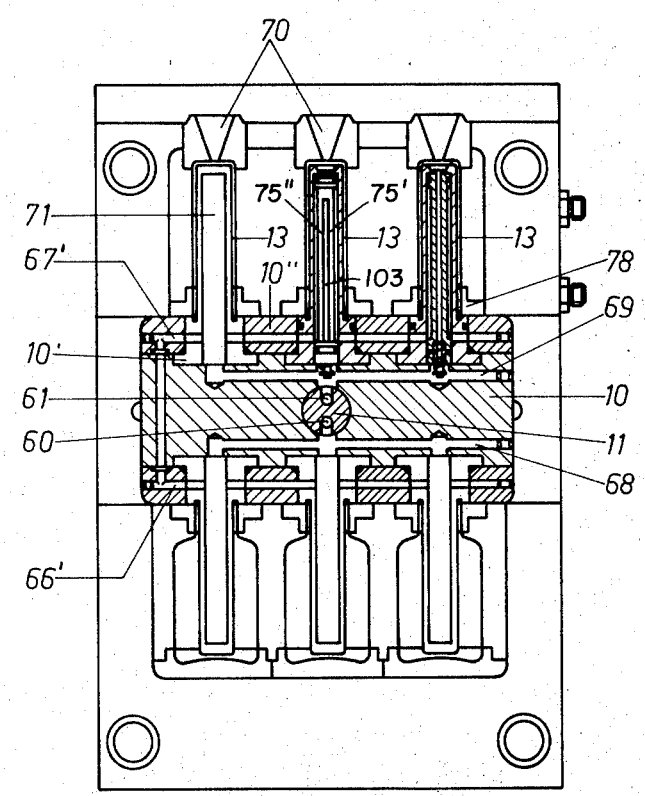
FIG. 3 shows a cross section through the device along the line a—a of FIG. 2.

As can be seen in FIGS. 1–3, the device of the invention includes a single core carrier 10, 10′, 10″ which is mounted on a core rotation shaft 11, 12 whose axis coincides with the center axis b—b of the die closing unit. The core carrier carries two identical rows of three cores 71–75 each, one row of cores extending into the injection molds 8, 8′, 9, 9′, 78, while the other row of cores extends into the blow molds 8, 9, 94, the cores being equidistant and axially aligned with one another. The axes of the two rows of cores 71–75 form a plane which, when the die is closed, coincides with the common separation plane a—a of all injection molds and blow molds. The cavities of the injection molds 8, 8′, 9, 9′, 78 are formed by the two die blocks 8′, 9′ in combination with the form pieces 78 for the bottle necks. The cavities of all blow molds are formed by the two die blocks 94. The die blocks 8′ and 9′ of the injection molds and the die blocks 94 of the blow molds are supported by a common mounting plate 8 and 9, respectively, which extends transversely over all injection molds and blow molds. The injection bushings 70 for the injection molds are arranged in their common separation plane a—a.

The core carrier rotation shaft 11, 12 is journalled inside a bushing 101 in the movable mounting plate 8 and inside a bushing 102 in the stationary mounting plate 9. The shaft sections 11 and 12 are axially movable inside the bushings 101 and 102. In the area of the movable die plate 5, the shaft section 12 carries an abutment collar 43 which faces a corresponding abutment ring 44, which latter is mounted on the movable mounting plate 8 by means of a support 46 in such a way that the axial distance between the abutment shoulder 43 and the abutment ring 44 is one-half of the opening displacement of the die plate 5. The abutment ring 44 is of a soft, impact-dampening material. The shaft section 11 similarly carries an abutment collar 34 which faces an abutment ring 45 mounted on the stationary mounting plate 9 by means of a support 47, the axial distance between the collar 34 and the ring 45 being again one-half of the die displacement. The aforementioned abutments on the core rotation shaft thus cause the latter to be moved axially by one-half the distance of the die displacement so that, when the die is fully open, the core carrier is positioned half-way between the open mold halves in which position it can be rotated by 180° for the next operating cycle. The two supports 46 and 47 for the abutment rings 44 and 45 also serve to center the mounting plates 8 and 9 of the injection and blow molds on the die plates 5 and 3, respectively, by engaging centering bores in the latter (FIG. 2).

Each of the cores (FIGS. 3–4) includes two concentrically arranged elongated sleeves 71 and 72, the two sleeves forming an annular cylindrical cavity between them. The annular cavities of the mold cores communicate with one another via the connecting channels 66′ and 67′ (FIG. 3) which in turn lead via two bores 66 and 67 (FIG. 2), to two axial bores 58 and 59 in the shaft section 12. Heating oil can be pumped through this channel system into the cores. In order to obtain an even temperature along the core sleeve 71 which forms the inner boundary of the injection molds and which carries the preformed bottle into the blow mold, the annular cavity between the core sleeves 71 and 72 is longitudinally subdivided by means of baffles 103 (FIG. 3) to form two cavity portions 75′ and 75″ which communicate near the outer end of the core at 75. This structure causes the heating oil to move axially through the entire length of the annular cavity of each core, rising on one side of the sleeve 71 and descending on the other side, before it enters the annular cavity of the next core. Via the connecting channels 67′, 67, and the axial shaft channel 59, the heating oil exits to an oil heater (not shown) which supplies heated oil through the connection 50 into the entry channel 58.

Figure 4:
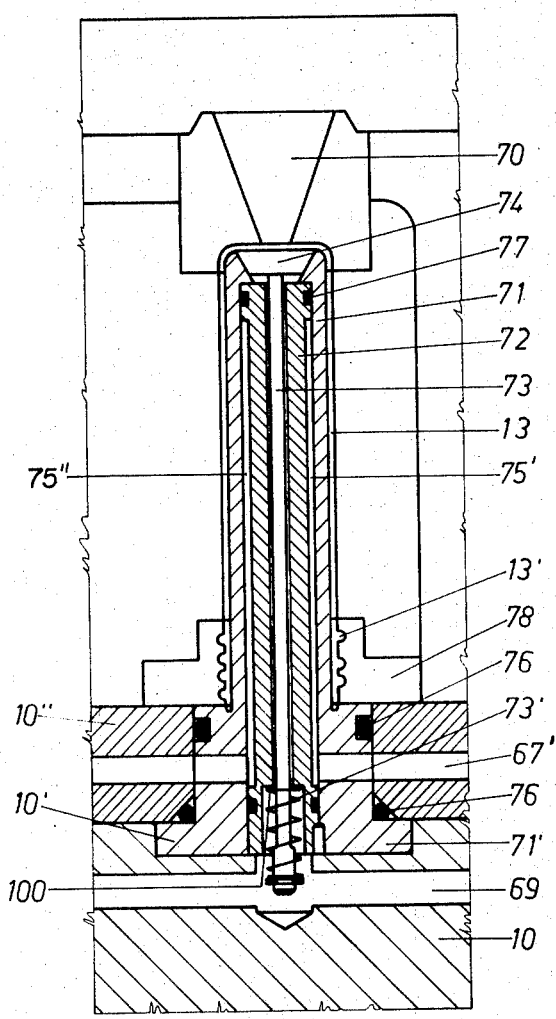
FIG. 4 shows an enlarged detail of FIG. 3 following injection of the raw material.

Each outer core sleeve 71 has an opening on its far end face, the opening being normally closed by a frustum-shaped valve 74 whose stem 73 extends axially through a center bore in the inner core sleeve 72 (FIG. 4). The valve 74 is kept closed by means of a spring arranged on the other end of the valve stem 73, the spring being positioned by means of a shoulder 100 on the inner core sleeve 72. A gap between the valve stem 73 and the central bore of the inner core sleeve 72 allows air to be pumped through the open valve 74 into a premolded bottle which surrounds the outer core sleeve 71. The air is supplied through air channels 68 and 69 in the core carrier (FIG. 3) which in turn communicate with axial entry and exit channels 60 and 61 in the shaft section 11 of the core rotation shaft. These supply channels are arranged on opposite sides of the axis b—b of the die closing unit and their axes form a plane which is perpendicular to the separation plane a—a of the die. The oil channels 58 and 59 include radially oriented end portions 64 and 65 extending in opposite directions and communicating with annular grooves 95 and 96 in the non-rotating connecting head 49 (FIG. 2). The annular grooves in turn are open to outside connections for the circulation of heated oil (only the entry connection 50 is shown). The non-rotating connecting head 49 is axially fixed on the shaft section 12 and positioned against rotation by means of a parallel guide pin 48 which extends from the movable die plate 5. The connecting head can axially move along the guide pin by as much as one-half of the die displacement to accommodate the relative axial displacement between the shaft section 12 and the movable die plate 4. Possible leakage between the rotating shaft and the non-rotating connecting head 49 is prevented by a pair of O-rings.

Each of the two air supply channels 60 and 61 has two radial end portions 63 and 63'', and 63' and 63''', respectively, the axial distance between a pair of end portions corresponding to the axial displacement of the core rotation shaft, which is one-half of the die displacement. The lower and upper air supply channels 60, 68 and 61, 69 do not communicate with one another (FIG. 3), and only the lower air supply channels 60 and 68 which lead to the cores positioned in the blow molds are communicating with the air supply bore 62 through which air can be pumped into the blow molds both in the closed die position and in the open die position. For design and assembly purposes the shorter shaft section 11 is made of one piece, while the longer shaft section 12 is composed of a hollow shaft 12 and a removable shaft core 12' which carries the oil supply channels 58 and 59 in the form of longitudinal grooves. Together with the core carrier 10, the shaft sections 11 and 12 form a rigid assembly.

The core carrier 10, 10', 10'' includes a central block 10 with a bore into which the shaft sections 11 and 12 are fitted. On the central block 10 are mounted six core sockets 10' which are held in place by two retaining blocks 10''. The earlier-mentioned air supply channels 68 and 69 extend through the central block 10, whereby each channel communicates with one row of core sockets 10' without communicating with the other air supply channel. Through each one of the two retaining blocks 10'' extends one of the oil supply channels 66' and 67', these channels being interconnected by a vertical cross-bore on one side of the core carrier, while the other ends of the oil supply channels 66' and 67' communicate with the shaft channels 58 and 59 at their radial end portions 66 and 67 in a way not specifically shown in the drawing. The oil supply channels 66' and 67' have communicating bores in the core sockets 10' which lead to the annular core cavities between the core sleeves 71 and 72.

The blocks 94 which form the mold plates of the blow molds include cooling channels 53 (FIG. 2) which facilitate a rapid cooling of the finished bottles, before the latter are ejected from the die. The injection molds on the other hand, include additional heating channels 52 whose purpose is to control the temperature of the injection molds, in order to avoid premature hardening of the premolded bottles on their cores.

FIG. 6 shows an enlarged plan view of the drive for the core rotation shaft 10, 11, the basic drive unit being supported on a transverse 22, the ends of which are attached to the vertical cylinder struts 3' of the stationary die closing unit. The traverse 22 is held and positioned in the struts 3' by means of centering trunnions 38 and 39, which are clamped to the struts 3' by bolts 40 and 41. The drive unit further includes a hydraulic motor 24 to which is connected a hollow drive shaft 31 which in turn drives a telescopic connecting shaft 33 coupled to the shaft section 11 of the core rotation shaft via its abutment collar 34 and coupling 35. The telescopic connecting shaft 33 engages the hollow drive shaft 31 by means of a groove in the connecting shaft which is engaged by two pins 32 of the drive shaft.

On the hollow drive shaft 31 is arranged a worm (not shown) which engages a worm gear which is encased in a gear housing 30 (FIG. 1). The worm gear drives a vertical shaft 42 on the upper end of which is mounted a control disc 26. This control disc carries on its periphery two adjustable switching cams 27 and 28 which move in two separate planes and which engage the control elements of a drive switch 29. This drive switch controls the hydraulic motor 24 in such a way that the drive shaft is rotated 180° after each injection and blowing cycle, the direction of rotation being reversed after each cycle. The precise angular repositioning of the core carrier relative to the injection molds and blow molds is obtained by the rectangular outline of the core carrier itself whose retaining blocks 10'' form outer shoulders which engage matching inner shoulders on the blocks which form the mold halves of the injection and blowing die. The shoulders of the retaining blocks 10'' are rounded in order to facilitate their engagement between the shoulders of the mold halves. The two sections of the die are further centered against one another by means of a pilot pin 54 (FIG. 2) which engages a centering bushing 56 in the opposite die section, when the two sections approach one another during the closing movement.

Figure 8:
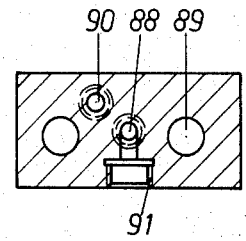
FIG. 8 shows another cross section of the manifold injection nozzle taken along line 8—8 of FIG. 9.
Figure 7:
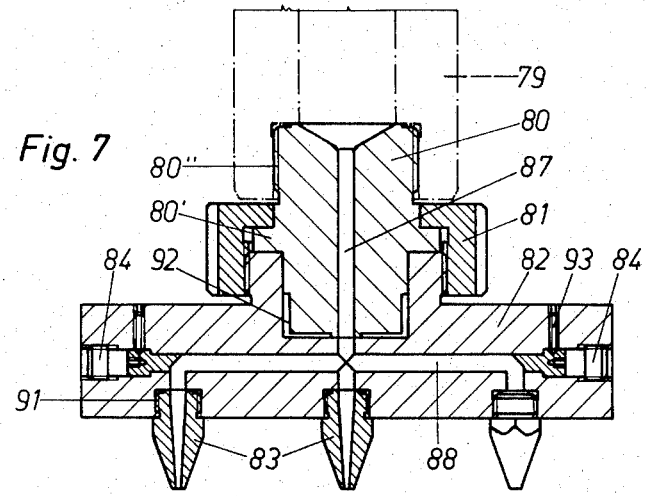
FIG. 7 shows an enlarged cross section through the manifold injection nozzle taken along line 7—7 of FIG. 9.
Figure 9:
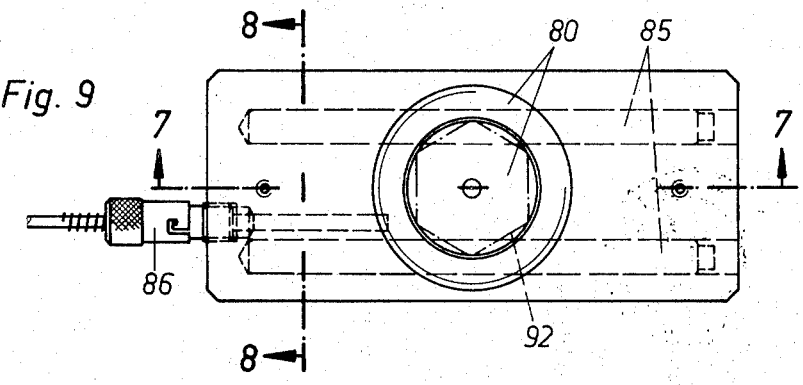
FIG. 9 shows the manifold injection nozzle of FIGS. 7 and 8 in a plan view.

FIGS. 7-9 show details of the manifold injection head which is mounted to the lower end of the injection unit (FIG. 1). FIG. 7 shows the lower end of the injection cylinder 79 to which is attached a connecting sleeve 80 which holds a nut 81. The connecting sleeve 80 includes a hexagon 92 by which it can be tightly screwed into the threaded bore 80'' of the injection cylinder 97. The threaded nut 81 is carried by the shoulder 80' of the connecting sleeve 80, and in turn clamps the manifold block 82 against the connecting sleeve. In the manifold block is arranged a longitudinal bore 88 which communicates with the central bore 87 of the connecting sleeve and which leads to three injection nozzles 82 which are arranged in a row at the bottom of the manifold block. The two extremities of the longitudinal bore 88 are closed off by means of plugs 84 which are secured in position by pins 93. The manifold block further includes two horizontal bores 89 (FIG. 8) inside which are positioned heating elements 85 (FIG. 9) It may further include a bore 90 for the accommodation of a temperature sensor 86. The individual injection nozzles 83 are removably mounted in the manifold block 82 by means of threaded connections 91.

The operation of the device of the invention is as follows:

Referring to the configuration of FIG. 2, the device is shown at a point of the operational cycle in which the injection molds 8', 9' and the blow molds 94 are closed, the injection operation into the injection mold having been completed to produce a premolded bottle 13, and the previously premolded and transferred bottle 14 having been blow-formed to its final shape inside the blow mold. While the blow mold is being cooled by a cooling medium flowing through the channels 53, the injection mold is maintained heated by a heating medium flowing through the channels 52.

The die closing unit is now opened by relieving the closing pressure in the hydraulic cylinder 3'' and by actuating the opening cylinder 4 (FIG. 1). This causes the movable mounting plate 5 to move to the left, carrying with it the die elements 8', 8, 94 which are situated to the left of the separation plane a—a and which constitute one-half of the injection molds and blow molds. During the first half of the die displacement the core rotation shaft as well as the core carrier itself remain in their original axial position. Thus, the premolded bottles 13 and the finished bottles 14 remain initially in contact with the stationary mold half on the right-hand side of the separation plane a—a. After one-half of its opening displacement, the abutment ring 44, which is solidary with the movable die plate 8, contacts the abutment collar 43 on the core rotation shaft section 12, causing the shaft 11, 12 to move in unison with the movable half of the die over the second half of the total die displacement. This axial shaft displacement causes the core carrier to be positioned half-way between the opened injection molding die, the upper row of cores carrying a set of preformed bottles 13 and the lower row carrying a set of finished bottles 14. At the end of the die opening motion, the second abutment collar 34 of the shaft section 11 has reached the stationary abutment ring 45 so that the axial position of the core rotation shaft 11, 12 is determined in both directions. The identical end position would also be reached, if the shaft 11, 12 and the core carrier assembly with the bottles first move in unison with the movable die section over on-half of the die displacement until the abutment collar 34 reaches the abutment ring 45, whereupon the movement of the shaft and core carrier is stopped, while the movable die section continues its opening motion away from the core carrier assembly.

Figure 5:
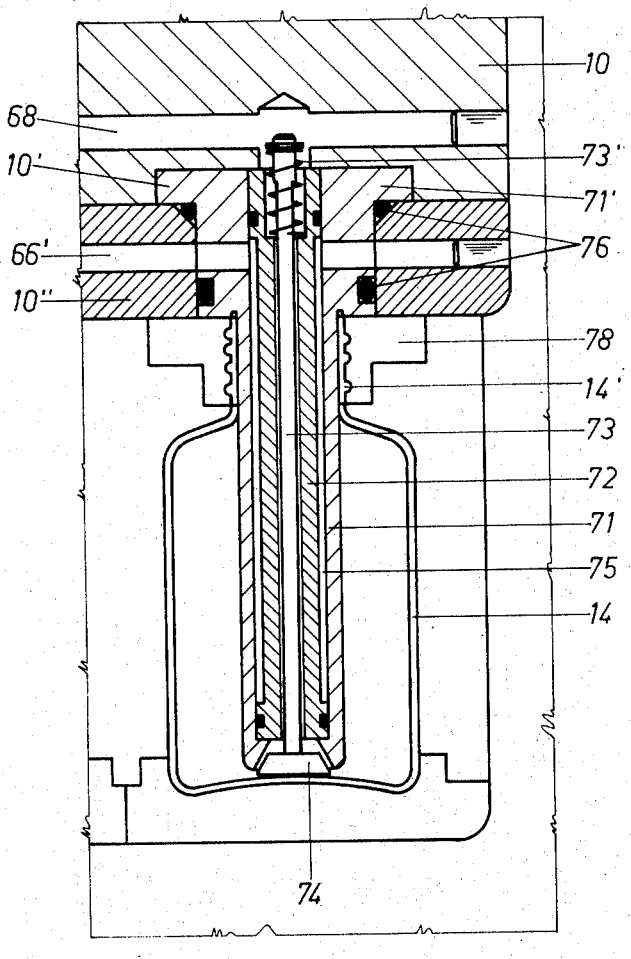
FIG. 5 shows another enlarged detail of FIG. 3 following the blowing operation.

It is now possible to eject the set of finished bottles 14 from their respective cores by pumping compressed air through the supply channel 62, which is in communication with the radial channel portion 63 in the shaft section 11, the air entering through the lower row of cores across the core valves 74 (FIG. 5). The bottles falling from their cores are removed from the injection molding machine by means not specifically shown here.

Coincident with the ejection of the finished bottles 14, the hydraulic motor 24 of the shaft drive is set in motion to rotate the core carrier shaft. This rotation, which is stopped after 180° by the switching cams 27 and 28 on the control disc 26, causes the upper set of cores with their premolded bottles 13 to be positioned in line with the blow molds, while the empty row of cores from which the finished bottles have been ejected moves into alignment with the injection mold. The injection and blowing die can now be closed for the next operational cycle which involves a simultaneous injection of raw material into the upper row of injection molds and a blowing operation shaping the premolded bottles in the lower row of blow molds. Simultaneously, the injection molds as well as the cores positioned in the injection molds are heated through the circulation of heating oil through the network of heating oil channels previously described. At the same time, the blow molds are cooled so that the bottles 14 are hardened as they reach their final shape and contact the walls of the mold. With this arrangement, it is also possible to maintain the circulation of heating oil through the cores of both core rows even while the die is opened and the core carrier is rotated.

The air for the blowing operation is again supplied through the stationary air channel 62, the radial channel 63'', and the air channels 60 and 68 into the lower row of cores. Under this air pressure, the core valves 74 open automatically to admit the air into the bottles, causing the latter to expand. The core valves 74 of the cores in the injection molds are held closed by their springs 73'', thereby presenting a closed exterior surface of the outer core sleeve 71 during injection.

The device of the invention thus includes only two operational stations inside a single die assembly, one station producing a row of premolded bottles 13, while the other station simultaneously produces a row of finished bottles 14. It is a further advantage of the invention that it only requires commercially available drive components for the transfer operation. These can be the same components as are used in other injection molding applications for the insertion and removal of threaded cores for example. It should also be noted that the injection molding machine used for this purpose does not require any modifications which would impede the conversion of the machine from an injection and blowing process to a simple injection process, or vice versa. The two sections of the injection and molding die are attached to the die plates in the same manner as any other injection molding die.

What is claimed is:

1. In an injection molding machine, a device for the production of hollow plastic articles such as bottles from thermoplastic raw material in an injection and blow-molding process, comprising in combination:
   a die closing unit including two spaced die plates with parallel opposite faces for the mounting thereon on the separable halves of a die and actuating means for moving the die plates relative to one another so as to open and close the die mounted therebetween;
   a compound injection and blow-molding die mounted on the mounting faces of the two die plates, the die including two separable die halves defining a separation plane between them which is substantially parallel to the mounting faces of the die plates; the two die halves forming matching halves of an injection mold and of a separate blow mold for the premolding by injection and subsequent blow-forming of the plastic articles, the injection mold and the blow mold being arranged diametrically opposite one another in relation to a die center axis which is perpendicular to the die separation plane; and
   a core carrier assembly rotatable around the die center axis and axially freely movable along the same axis, the core carrier assembly including:
   a core carrier block arranged between the die halves and having mounted on it a plurality of identical cores of which one set is in alignment with the injection mold and another set is in alignment with the blow mold; and a core carrier shaft fixedly attached to the core carrier block and extending axially through both die plates along the die center axis;

channel means in the core carrier assembly for circulating a heat transfer medium through the cores; and channel means in the core carrier assembly for supplying compressed air to the cores positioned in the blow mold, the air supply channel means including a separate air channel for each set of cores and air connection means for establishing communication with only that air channel which leads to the cores positioned in the blow mold in both the closed die position and the open die position for blow-forming and ejection of the articles;

the device further including:

abutment means defined by the core carrier assembly and by the die plates, respectively, for axially positioning the core carrier assembly between the opened die halves; and means for rotating the core carrier assembly between a first angular position in which one set of cores cooperates with the injection mold serving as mold cores and carrying the premolded articles after mold opening, and a second angular position in which the same cores cooperate with the blow mold serving to position the premolded articles therein.

2. In an injection molding machine, a device for the production of blow-molded plastic articles comprising in combination:

a die closing unit including two spaced die plates with parallel opposite faces for the mounting thereon on the separable halves of a die and actuating means for moving the die plates relative to one another so as to open and close the die mounted therebetween;

a compound injection and blow-molding die mounted on the mounting faces of the two die plates, the die including two separable die halves defining a separation plane between them which is substantially parallel to the mounting faces of the die plates; the two die halves forming matching halves of an injection mold and of a separate blow mold for the premolding by injection and subsequent blow-forming of the plastic articles, the injection mold and the blow mold being arranged diametrically opposite one another in relation to a die center axis which is perpendicular to the die separation plane; and a core carrier assembly rotatable around the die center axis and axially freely movable along the same axis, the core carrier assembly including:

a core carrier block arranged between the die halves and having mounted on it a plurality of identical cores of which one set is in alignment with the injection mold and another set is in alignment with the blow mold; and a core carrier shaft fixedly attached to the core carrier block and extending axially through both die plates along the die center axis;

the device further including:

abutment means defined between the core carrier shaft and the die plates for axially positioning the core carrier assembly between the open die halves; the abutment means being two cooperating pairs of abutment elements, each pair including an inwardly facing abutment collar on the shaft and an outwardly facing abutment ring on the die plate nearest it, the abutment elements being so positioned that, when the die is closed, the sum of the axial displacement distances between the cooperating abutment elements is equal to the total die opening displacement; and means for rotating the core carrier assembly between a first angular position in which one set of cores cooperates with the injection mold serving as mold cores and carrying the premolded articles after mold opening, and a second angular position in which the same cores cooperate with the blow mold serving to position the premolded articles therein.

3. A device as defined in claim 2, further including:

centering means arranged between the core carrier and the injection and blow-molding die halves, the core carrier having outer edges forming two parallel centering shoulders; the injection die halves and molding die halves having matching parallel centering recesses; and the axial distance between the centering shoulders is such that, when the die halves are completely closed, their centering recesses engage the centering shoulders on the core carrier, thereby accurately positioning the cores inside the molds.

4. A device as defined in claim 2, wherein:

the rotating means for the core carrier shaft includes a drive motor, a stationary drive support removably attached to the die closing unit in axial alignment with the core carrier shaft, including centering means for the maintenance of said alignment, the means for accomodating the axial displaceability of the core carrier shaft including a telescoping connecting shaft between the motor and the core carrier shaft.

5. A device as defined in claim 4, wherein:

the rotating means further includes a hydraulic motor as a drive motor, and drive control means including a worm gear drive connected to the motor, a control disc driven by the worm gear, motor switching means on the drive support, and at least two switching cams on the control disc which cooperate with the switching means in such a way that the drive reciprocates, the motor being stopped after 180° of angular motion of the connecting shaft, moving in the opposite direction, when restarted, until it is again stopped after 180° of rotation.

6. A device as defined in claim 1, wherein:

each core on the carrier block includes: an outer core sleeve defining the exterior shape of the core; a mounting socket at the near end of the outer core sleeve sealingly engaging the core carrier block; an air valve closing off the far end of the outer core sleeve; an inner core sleeve defining an annular heating channel between it and the outer core sleeve, the near and far ends of the inner core sleeve being sealingly retained so as to delimit the length of said annular channel; a pair of longitudinal baffle members arranged in the annular channel at opposite sides of the core so as to subdivide the channel into two parallel semi-annular channels, the baffle members being shortened at the far end of the annular channel to provide a communication between the semi-annular channels; a central air channel inside the inner core sleeve extending from the core carrier assembly to the air valve;

the channel means for circulating a heat transfer medium through the cores includes a pair of heating channels leading longitudinally through the core carrier shaft to the near ends of said pair of semiannular channels of each core; and the two air channels extend longitudinally through the core carrier shaft, each channel leading to the near ends of said central air channels of one set of cores.

7. A device as defined in claim 6, wherein:
the air valve in each core is a poppet valve with a valve head forming a portion of the far end surface of the core and opening away from said surface, the valve further including a valve stem extending inwardly inside the central air channel of the inner core sleeve and a closing spring on the valve stem, the closing spring yielding under a predetermined air pressure acting against the inside of the valve head.

8. A device as defined in claim 6, wherein:
the cores mounted on the core carrier block form two diametrically opposite straight rows of cores;

the core carrier block has two parallel, oppositely oriented mounting faces thereon, a row of centering recesses for the mounting sockets of the cores in each mounting face, and a core retaining block for each row of cores having a row of bores surrounding and sealingly engaging the core mounting sockets;

the heating channels of the core carrier assembly include a longitudinal channel portion in each core retaining block, each core mounting socket including aligned connecting channels between said channel portion and the near ends of the semiannular heating channels inside the core, the two longitudinal channel portions being interconnected at one end of the two core retaining blocks, the opposite ends of said channel portions being connected to the heating channels running inside the core carrier shaft.

9. A device as defined in claim 8, wherein:
the core carrier shaft is in the form of two shaft sections attached to the core carrier block on opposite sides thereof in alignment with the die center axis;

the heating channels run longitudinally through one shaft section to the outside of the die closing unit and include a pair of outside connections on that shaft section; and the two separate air channels run longitudinallly in parallel through the other shaft section and include diametrically opposed radial inlet bores, each channel having two such inlet bores axially spaced apart a distance equal to the axial displacement of the core carrier assembly, said air connection means including a stationary bearing member surrounding the shaft section in the area of the radial inlet bores and a radial supply bore in the bearing member communicating with one of the shaft inlet bores leading to the cores positioned in the blow mold.

10. A device as defined in claim 4, wherein:
the centering means for the stationary drive support includes a traverse member extending at right angles to the axis of the core carrier shaft, with two centering trunnions attached to the ends of the transverse member and extending toward the die closing unit in parallel to said axis, the trunnions being arranged to engage matching centering bores in the die closing unit.

11. A device as defined in claim 4, wherein:
the first set of abutment means includes two cooperating pairs of abutment elements, each pair including an inwardly facing abutment collar on the shaft and an outwardly facing abutment ring on the die plate nearest it;

the telescoping connecting shaft of the rotating means is linked to the core carrier shaft by means of a coupling which forms a mounting unit with the abutment collar located on the side of the rotating means; and the rotating means further includes a hollow drive shaft arranged axially between the drive motor and the telescoping connecting shaft, one end of the latter reaching into the hollow drive shaft, where a troque-transmitting, axially adjustable engagement means between the two shaft forms a telescoping connection.

12. A device as defined in claim 11, wherein the rotating means further includes:
a housing enclosing the hollow drive shaft, the housing serving as a support for the drive motor and drive shaft, and being in turn supported by the transverse member;
a transverse control shaft journalled in the housing and having a protruding end;
a worm gear carried by the control shaft and a cooperating worm gear thread on the hollow drive shaft;

a control disc mounted on the protruding end of the control shaft;
two switching cams adjustably clamped to the periphery of the control disc, each having a protruding contact finger at a distinctive rotational level; and two cooperating stationary switches, each being operable by only one of the switching cams.

* * * * *